United States Patent
Van Meveren et al.

(10) Patent No.: US 7,902,690 B1
(45) Date of Patent: Mar. 8, 2011

(54) SYSTEM FOR GENERATING ELECTRICAL ENERGY FROM VEHICLE MOVEMENT ON A ROAD

(76) Inventors: Arie Allen Van Meveren, Colman, SD (US); Gregory Dale Van Meveren, Colman, SD (US)

( * ) Notice: Subject to any disclaimer, the term of this patent is extended or adjusted under 35 U.S.C. 154(b) by 0 days.

(21) Appl. No.: 12/702,387

(22) Filed: Feb. 9, 2010

(51) Int. Cl.
*F03D 9/00* (2006.01)
(52) U.S. Cl. .......................... 290/55; 290/1 R
(58) Field of Classification Search ............ 290/55
See application file for complete search history.

(56) References Cited

U.S. PATENT DOCUMENTS

| | | | | |
|---|---|---|---|---|
| 5,272,378 | A * | 12/1993 | Wither | 290/1 R |
| 5,592,028 | A * | 1/1997 | Pritchard | 290/55 |
| 6,409,467 | B1 * | 6/2002 | Gutterman | 415/4.3 |
| 7,098,553 | B2 * | 8/2006 | Wiegel et al. | 290/55 |
| 7,193,332 | B2 * | 3/2007 | Spinelli | 290/1 R |
| 7,427,173 | B2 * | 9/2008 | Chen | 404/71 |

FOREIGN PATENT DOCUMENTS

| | | | |
|---|---|---|---|
| DE | 10204710 A1 | * | 8/2003 |
| GB | 2451588 A | * | 2/2009 |
| GB | 2465219 A | * | 5/2010 |
| JP | 2008144550 A | * | 6/2008 |
| WO | WO 0131196 A1 | * | 5/2001 |
| WO | WO 2008086945 A2 | * | 7/2008 |

* cited by examiner

*Primary Examiner* — Joseph Waks
(74) *Attorney, Agent, or Firm* — Jeffrey A. Proehl; Woods, Fuller, Shultz & Smith, PC

(57) ABSTRACT

An energy recovery apparatus for mounting on a structure to recover energy from air movement caused by vehicles passing under the structure is disclosed. The energy recovery apparatus may include a support assembly for mounting on the structure, and a rotating assembly rotatabaly mounted on the support assembly. The rotating assembly may include a rotating frame and a plurality of blades mounted on the frame such that the blades are free to be rotated by air movement caused by vehicle movement adjacent to the structure when the apparatus is mounted on the structure. The apparatus may also include a generator operatively connected to the rotating assembly to be driven by rotation of the rotating assembly, and to generate electrical power when rotated by connection to the rotating assembly.

21 Claims, 5 Drawing Sheets

SYSTEM FOR GENERATING ELECTRICAL ENERGY FROM VEHICLE MOVEMENT ON A ROAD

BACKGROUND

1. Field

The present disclosure relates to energy converting devices and more particularly pertains to a new system for generating electrical energy from vehicle movement on a road for capturing and converting energy from air movement caused by moving vehicles along a road.

2. Description of the Prior Art

It has become increasingly desirable to generate useful forms of energy in more environmentally-friendly ways, as well as conserving the amount of energy that is expended for everyday tasks. An example is the movement of vehicles along roads. The manner in which the vehicles are powered is changing and evolving, as internal combustion engines are combined with electric motors to form hybrid powerplants, or are replaced outright with electric motors powered by batteries or fuel cells. At the same time, the design of vehicles is changing to reduce the amount of energy that is needed to move the vehicles from point to point, such as through reductions in the weight of the vehicles and through increases in the efficiencies of the powerplants.

However, the numbers of vehicles moving along the roads of the country do not seem to decrease, but tend to increase every year. Thus, despite changes in the fuels used for operating vehicles, and increases in the efficiencies of vehicle operation, the amount of energy transferred to the environment by the movement of these ever-increasing numbers of vehicles does not lessen. Vehicle movement causes the movement of air located in front of, beside, and behind, the moving vehicle, generally in the same direction as the movement of the vehicle. The energy of the moving air is generally dissipated to the environment adjacent to the road and is not conserved, much less captured and converted to a form of energy that can be more easily utilized and even transported from the location of capture and conversion.

SUMMARY

In view of the foregoing, the present disclosure describes a new system for generating electrical energy from vehicle movement on a road which may be utilized for capturing and converting energy from air movement caused by moving vehicles along a road.

The present disclosure relates to an energy recovery apparatus for mounting on a structure to recover energy from air movement caused by vehicles passing under the structure. The energy recovery apparatus may comprise a support assembly for mounting on the structure, and a rotating assembly rotatably mounted on the support assembly. The rotating assembly may include a rotating frame and a plurality of blades mounted on the frame such that the blades are free to be rotated by air movement caused by vehicle movement adjacent to the structure when the apparatus is mounted on the structure. The apparatus may comprise a generator operatively connected to the rotating assembly to be driven by rotation of the rotating assembly, and the generator generates electrical power when rotated by connection to the rotating assembly.

In another aspect of the disclosure, a system for generating electrical energy from vehicle movement on a road may comprise a structure spanning at least one traffic lane of a road having a road surface, and the structure is spaced above the road surface a sufficient distance to permit a vehicle to pass between the structure and the road surface as the vehicle travels along the road. The system may also include an energy recovery apparatus mounted on the structure to recover energy from air movement caused by vehicles passing under the structure on the road. The energy recovery apparatus may comprise a support assembly mounted on the structure, and a rotating assembly rotatably mounted on the support assembly. The rotating assembly may include a rotating frame and a plurality of blades mounted on the frame such that the blades are free to be rotated by air movement caused by vehicle movement adjacent to the structure. The apparatus may also comprise a generator operatively connected to the rotating assembly to be driven by rotation of the rotating assembly, the generator generating electrical power when rotated by connection to the rotating assembly.

There has thus been outlined, rather broadly, some of the more important elements of the disclosure in order that the detailed description thereof that follows may be better understood, and in order that the present contribution to the art may be better appreciated. There are additional elements of the disclosure that will be described hereinafter and which will form the subject matter of the claims appended hereto.

In this respect, before explaining at least one embodiment or implementation in greater detail, it is to be understood that the scope of the disclosure is not limited in its application to the details of construction and to the arrangements of the components set forth in the following description or illustrated in the drawings. The disclosure is capable of other embodiments and implementations and is thus capable of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present disclosure. It is important, therefore, that the claims be regarded as including such equivalent constructions insofar as they do not depart from the spirit and scope of the present disclosure.

The advantages of the various embodiments of the present disclosure, along with the various features of novelty that characterize the disclosure, are disclosed in the following descriptive matter and accompanying drawings.

BRIEF DESCRIPTION OF THE DRAWINGS

The disclosure will be better understood and when consideration is given to the drawings and the detailed description which follows. Such description makes reference to the annexed drawings wherein.

DETAILED DESCRIPTION

Figure 1:
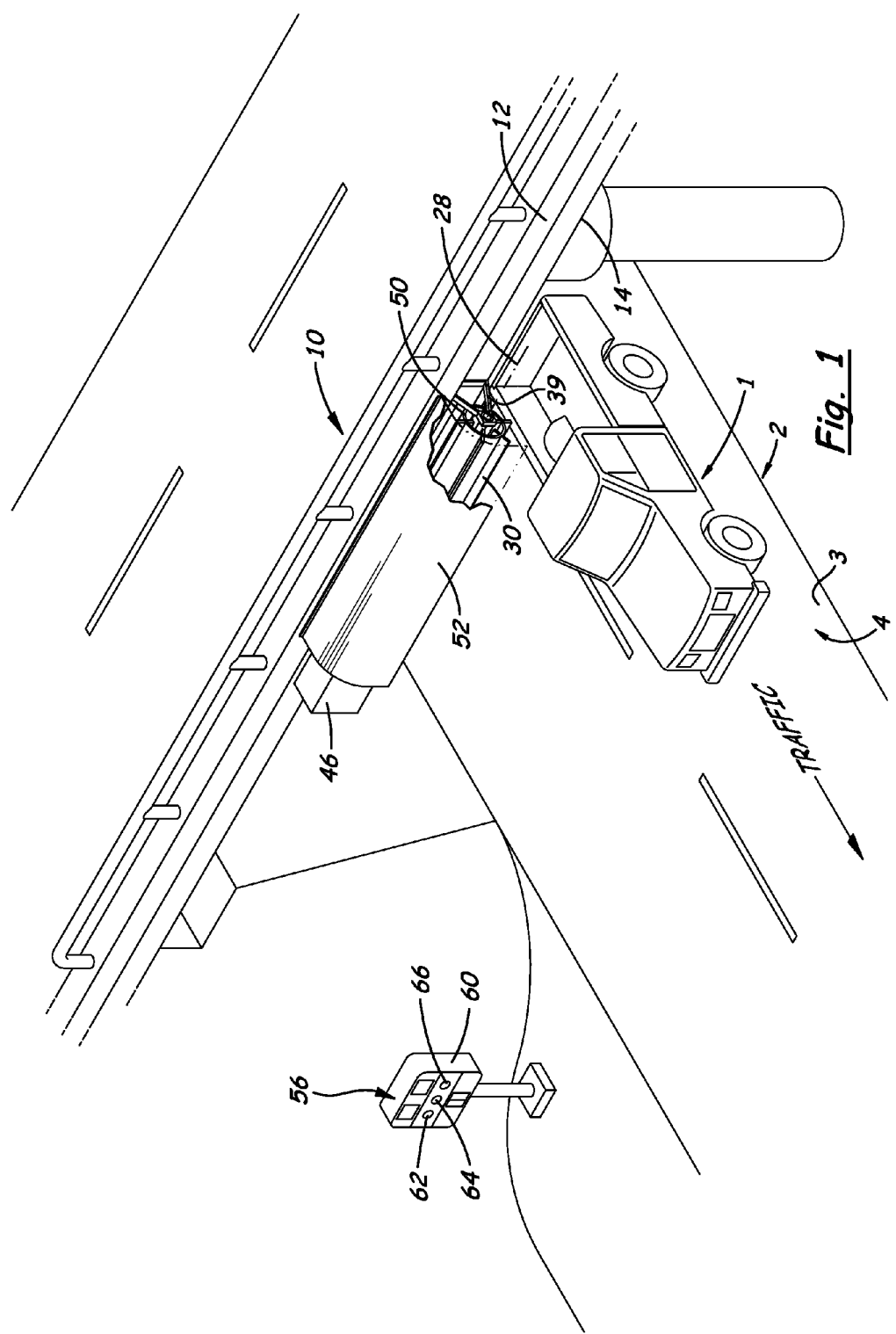
FIG. 1 is a schematic perspective view of a new system for generating electrical energy from vehicle movement on a road according to the present disclosure, showing the energy recovery apparatus mounted on a structure spanning a road on which vehicles travel.
Figure 2:
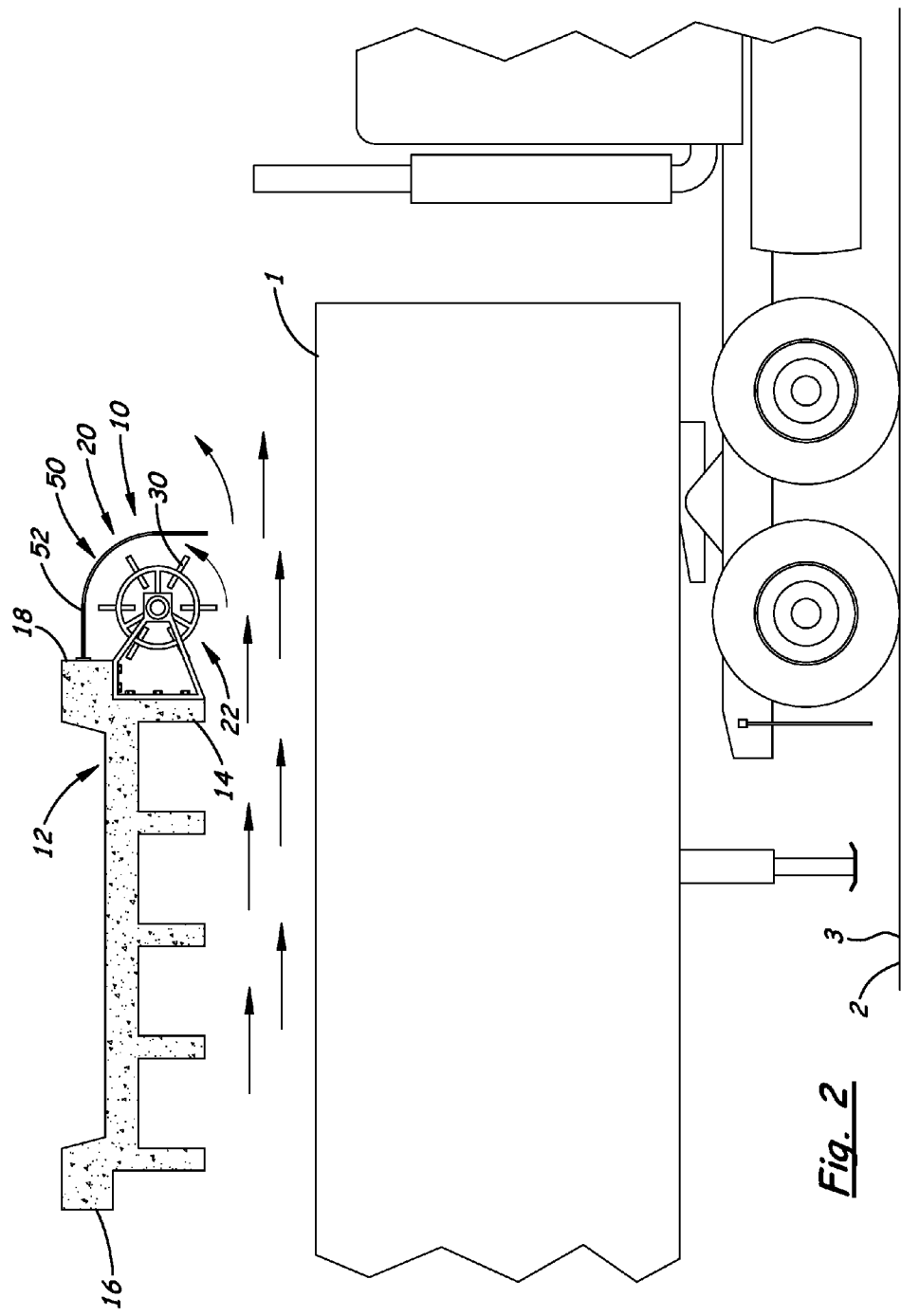
FIG. 2 is a schematic side view of aspects of the system, according to an illustrative embodiment.
Figure 3:
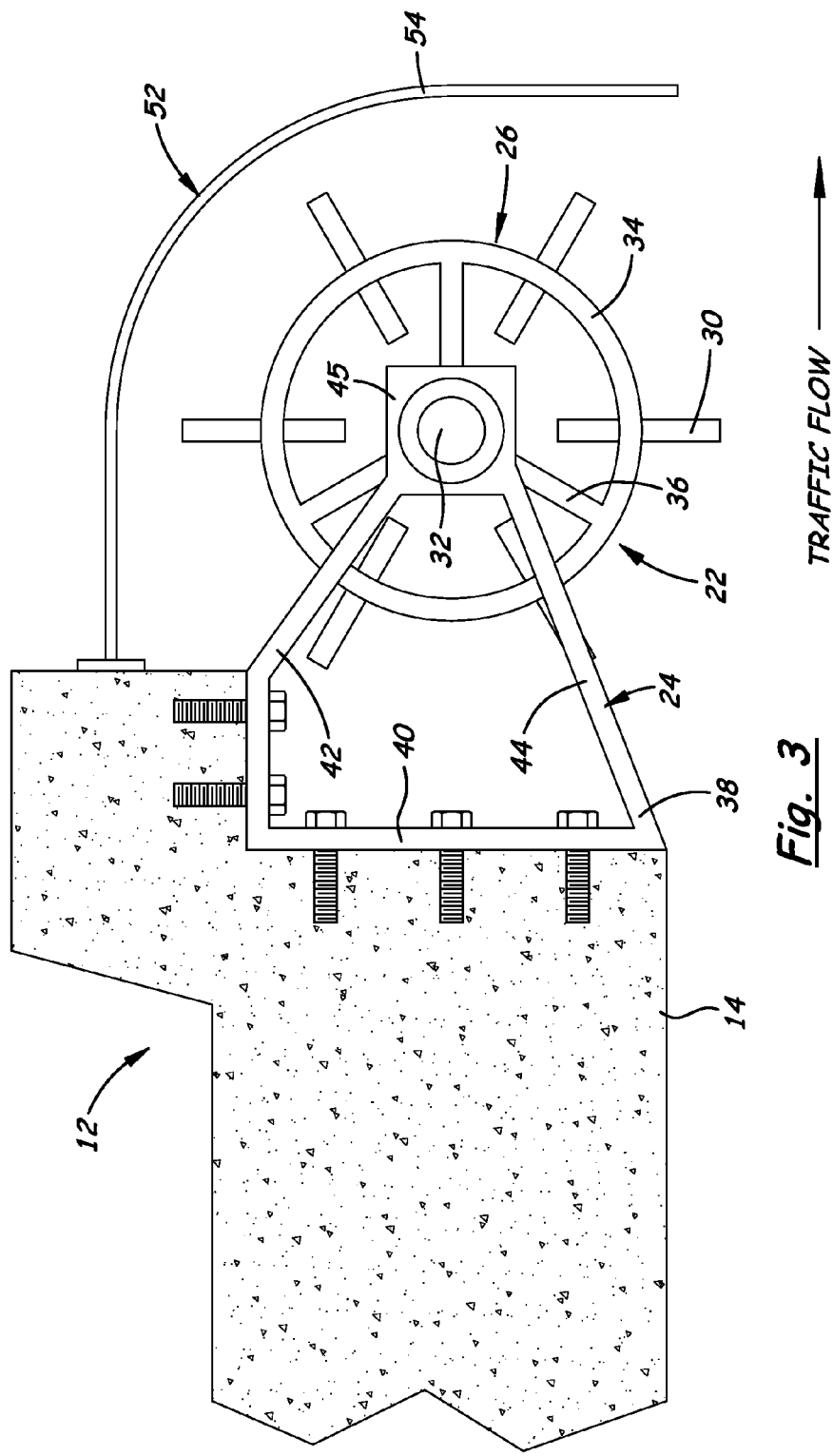
FIG. 3 is a schematic side view of the rotating assembly and support assembly of the system with the shield, according to an illustrative embodiment.
Figure 4:
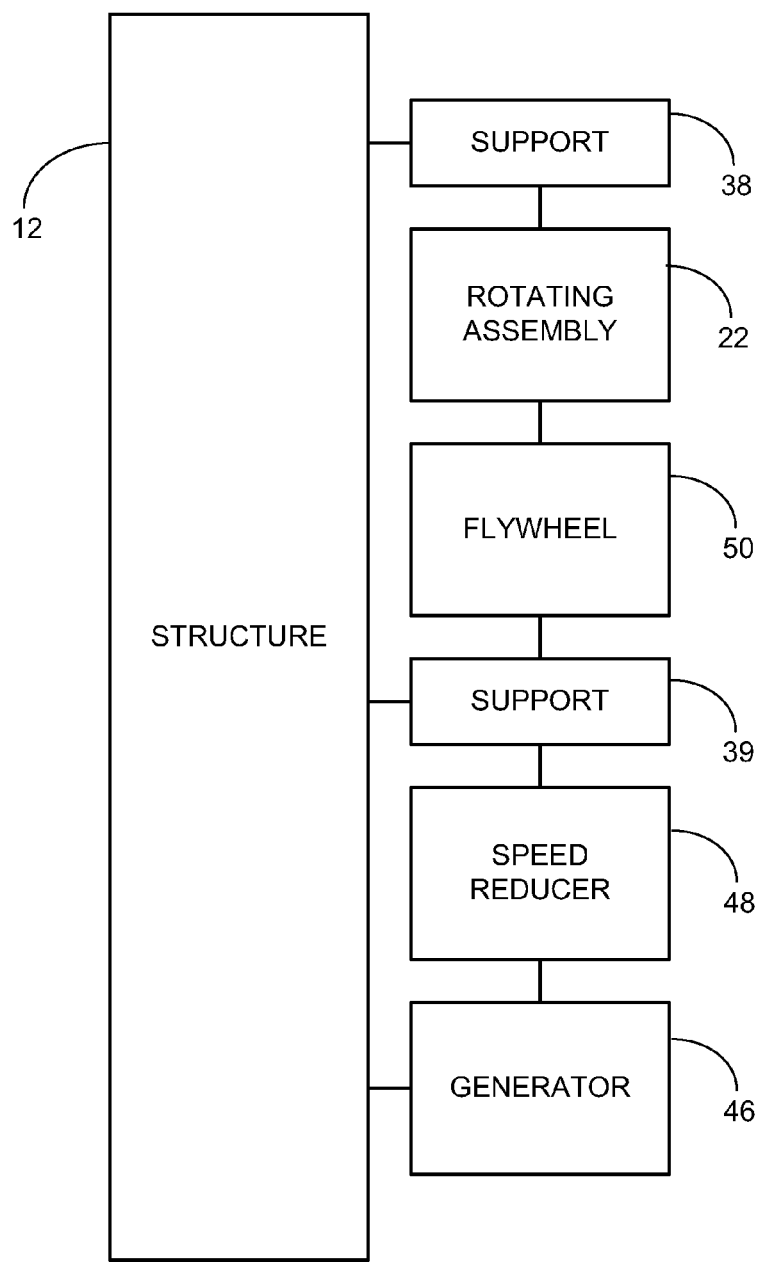
FIG. 4 is a schematic block diagram of aspects of the system, according to an illustrative embodiment.
Figure 5:
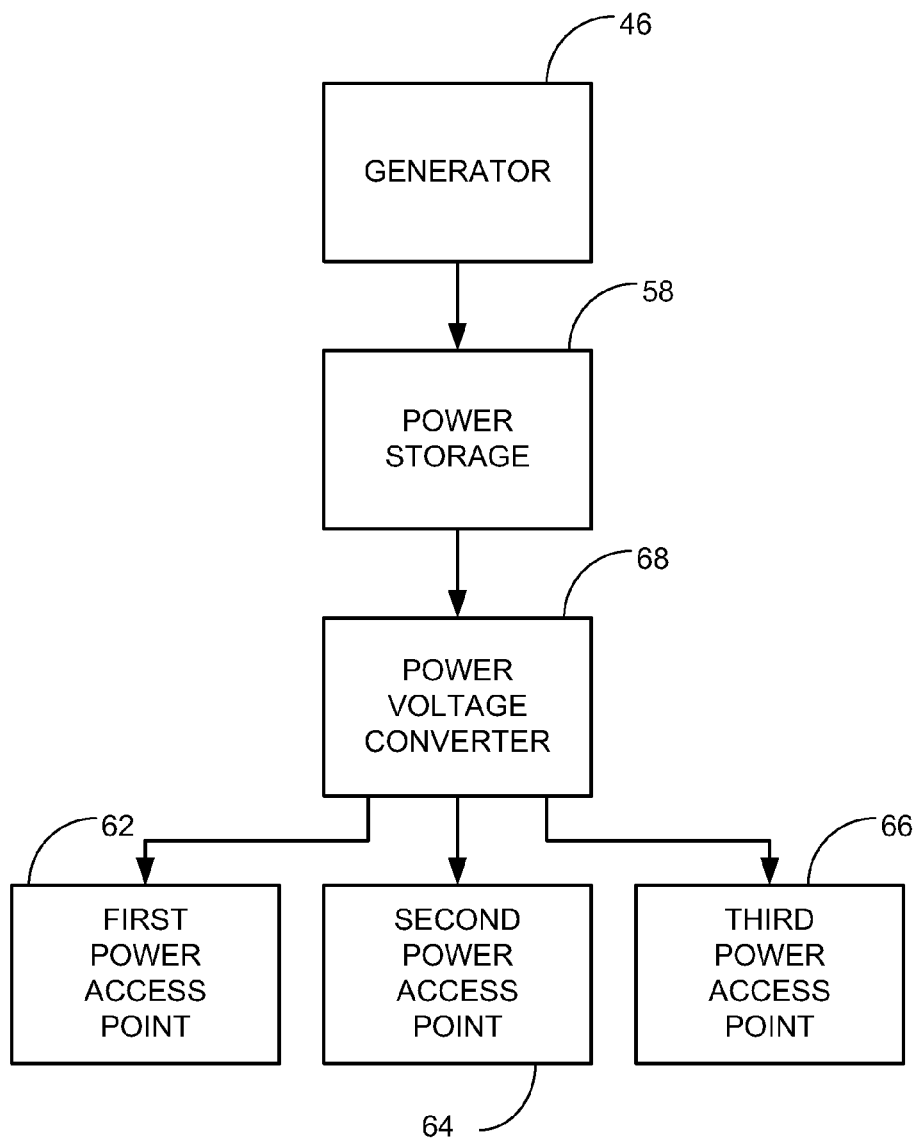
FIG. 5 is a schematic block diagram of additional aspects of the system, according to an illustrative embodiment.

With reference now to the drawings, and in particular to FIGS. 1 through 5 thereof, a new system for generating electrical energy from vehicle movement on a road embodying the principles and concepts of the disclosed subject matter will be described.

In general, the disclosure relates to a system 10 for generating electrical energy from the movement of vehicles 1 on a road 2, such as by driving the vehicles over the road surface 3. The movement of vehicles over a road surface, especially in a particular lane of the road surface, typically occurs in the same direction, and generally causes movement of air along the road in the same direction as the vehicle movement. The greater the density of cars moving along the road, the more air movement is caused along the road when measured at a particular location on the road. The system of the present disclosure takes advantage of the air movement, and the energy stored in the air movement, to covert the air movement into a different form of energy such as electrical power, although elements of the apparatus may be employed to convert the kinetic energy in the air movement to forms of energy other than electrical.

The system 10 may incorporate a structure 12 that spans at least one traffic lane 4 of a road 2 having the road surface 3, although the structure is not a critical element of the system. The structure 12 may be positioned above the road surface 3, and may be suitably spaced above the road surface 3 a distance sufficient to permit a vehicle 1 to pass between the structure 12 and the road surface 3 as the vehicle travels along the road so as not to obstruct or hinder the movement of the traffic along the road. Illustratively, the structure 12 may comprise a bridge overpass that carries traffic (such as cars, trains, or pedestrians) across the road 2, although other structures may be used, such as supports that extend over a road and carry traffic signs.

The structure 12 may include a lower surface 14, which may extend substantially parallel to the road surface 3 (although the crown on the road surface may prevent a perfect parallel relationship therebetween). The lower surface 14 may be the lowermost surface of the structure, such as the surface that is closest to the road surface 3 (and thus closest to the vehicles traveling over the road surface). The structure 12 may have a first side 16 and a second side 18, and the first side may be oriented toward the upstream direction of the traffic movement or flow and the second side may be oriented toward the downstream direction of the traffic flow.

In some embodiments of the structure 12, the lower surface 16 may extend substantially continuously from the first side 16 to the second side 18 of the structure 12, such as in the case of a concrete bridge in which the lower surface is poured concrete. In other embodiments, the lower surface may extend only a partial distance between the first 16 and second 18 sides of the structure, such as when the lower surface is formed on one or more support beams of a bridge that extends generally perpendicular to the direction of vehicle movement. The lower surface 14 of the structure 12 may be substantially planar from the first side 16 to the second side 18. The second side 18 may have a second side surface, which may be substantially vertically oriented.

The system 10 may also include an energy recovery apparatus 20 that is configured to recover energy from the air movement caused by the vehicles 1 passing under the structure 12 on the road surface. The apparatus 2 is preferably configured to be moved by the movement of air caused by vehicles passing by the structure 12 and the apparatus 20 and moving along the road. The recovery apparatus 20 may be mounted on the structure 12, and may be supported by the structure in a position above the road surface. In some preferred implementations, the structure 20 may be positioned adjacent to the lower surface 14 of the structure so that a portion of the structure extend to a vertical level that is lower than the height of the lower surface above the road surface, although this is not critical to the operation of the system 10. Also, the apparatus 20 may be mounted on the second side 18 of the structure 12, so that the vehicle passes by the apparatus 20 after having passed under the structure 12, although again this is not critical to the system.

The energy recovery apparatus 20 may include a rotating assembly 22 that is configured to be moved and rotated by the movement of vehicles on the road surface below the recovery apparatus, and a support assembly 24 for supporting the rotating assembly on the structure such that the rotating assembly is able to rotate with respect to the structure 12. The rotating assembly 22 may be supportable on the structure 12 so that the rotating assembly may rotate substantially freely with respect to the support assembly. The rotating assembly 22 may have a length that is adapted to various characteristics, such as the size of the structure 12 and the width of the road 2 or the traffic lane 4. In some embodiments, the length of the rotating assembly may be from approximately 15 feet to approximately 36 feet, and in many applications the length will be from approximately 16 feet to approximately 24 feet.

The rotating assembly 22 may include a frame 26 rotatable about a central axis 28 of the rotatable assembly, and at least one blade 30 mounted on and supported by the frame. The illustrative frame 26 may include a central member 32, and the central axis 28 may pass through the central member 32 such that the central member rotates on the central axis. The frame 26 may also include at least one blade support 34 for supporting the at least one blade 30. The illustrative blade support 34 may extend in a plane that is oriented substantially perpendicular to the central axis 28, and may have a substantially annular or circular shape which is substantially centered on the central axis. A plurality of spokes 36 may radiate from the central member 32 to the blade support 34 to support the blade support in position with respect to the central member. More than one set of blade support and spokes may be utilized on the rotating assembly 22 to support the at least one blade 30 on the central member 32, and a set may be located at opposite ends and intermediate positions along the length of the rotating assembly.

The at least one blade 30 may include a plurality of blades that are mounted on the frame 26. In some embodiments, the plurality of blades includes four to eight blades, although more or fewer blades may be employed, and the illustrative embodiments include six blades, which is highly preferred. Rotating assemblies 22 with fewer than four blades may not be as suitable for catching as much of the passing air movement as assemblies with at least four blades, and more than eight blades may add additional weight to the rotating assembly that is not accompanied by any efficiency gains. Each of the blades 30 may extend in a radially outward direction from the central axis 28, or may be skewed with respect to a line radiating from the central axis. The blades 30 may be mounted on the rotating frame 26 such that the longitudinal axis is oriented substantially parallel to an axis about which the rotating assembly rotates, such as the central axis. In some of the more preferred embodiments, the distance between the outer tips or edges of the blades of the rotating assembly is approximately 5 feet to approximately 7 feet, although somewhat smaller or somewhat larger distances may be also be employed.

Each of the blades 30 may have planar face surfaces, although blades with curved surfaces may also be employed. A portion of a lowermost one of the blades of the rotating assembly 22 may extend to a vertical level that is lower than the vertical level of the lower surface 14 of the structure 12. The distance that the lowermost blade protrudes below the lower surface 14 may be up to approximately 12 inches, and a protrusion of approximately 8 inches may be highly suitable.

The support assembly 24 that supports the rotating assembly 22 may include a pair of supports 38 that are mounted on the structure 12, and may be mounted on the second side 18 thereof. The locations of the pair of supports 38 on the structure 12 may be spaced from each other, and the supports 38 may extend outwardly from the second side 18 of the structure. Each of the supports 38 may include a base member 40 for attachment to the structure 12. Each support may also include a first support member 42 that is connected to, and that extends outwardly from, the base member 40. Each support 38 may also include a second support 44 that is connected to and extends outwardly from the base member. The first support member 42 may be positioned above the second support member 44. Each supports may also include a bearing support 45 that receives a portion of the central member 32 in a manner that permits rotation of the central member with respect to the bearing support. The bearing support 45 may be mounted on at least one of first support member and the second support member, The energy recovery apparatus 20 may also include a generator 46 that is operatively connected to the rotating assembly 22 so that the generator is able to be driven or rotated by the rotation of the rotating assembly. The generator 46 generates electrical power when rotated through the connection to the rotating assembly 22. The generator 46 may be mounted on the structure 12 at a location adjacent to the rotating assembly 22 and may also be located adjacent to one of the supports 38, 39 of the support assembly 24.

Optionally, the apparatus 20 may also include a speed reducer 48 that is operatively connected between the rotating assembly 22 and the generator 46 to reduce the speed of rotation that is transferred from the rotating assembly to the generator. The speed reducer 48 may include gearing that converts the relatively faster rotation speed of the rotating assembly to be reduced as the rotation is transferred to the generator. Gears with suitable gear ratios may be employed to match the typical rotation speed of the rotating assembly to the preferred rotation speed of the generator. The rate of rotational speed reduction may be fixed, or may be adjustable depending upon the operating conditions. In some preferred embodiments, the speed reduction ratio is approximately 3:1.

In some embodiments of the apparatus 20, a flywheel 50 is operatively connected to the rotating assembly 22 to rotate with the rotating assembly to help minimize variations in the rotational speed of the rotating assembly, and help store some of the recovered energy as kinetic energy. The flywheel 50 may be incorporated into the rotating assembly, the speed reducer, or even the generator. In some embodiments, the flywheel 50 is positioned adjacent to the rotating assembly opposite of the generator 46.

The energy recovery apparatus 20 may also include a shield 52 that is positioned over at least a portion of the rotating assembly 22. The shield 52 may have a number of functions and benefits, such as helping capture and direct a portion of the air moving under the structure 12 into and about the rotating assembly, while also help to move the air in a direction outwardly from the ends of the rotating assembly. The shield may also help to divert falling precipitation from coming into contact with and accumulating on the rotating assembly. The shield 52 may be mounted on the structure 12, and may extend outwardly from the structure. The shield 52 may include a shield wall 54 which may have an arcuate cross sectional shape that is generally centered on the central axis of the rotating assembly. A cross section of the shield 52 may extend in an arc, and the arc may be a quarter-circular arc. The shield 52 may extend along a portion of the length of the rotating assembly, and may extend, for example, from proximate to one support 38 to proximate to the opposite support 39. The ends of the shield may be open to permit air that enters the interior of the shield to exit the interior through the open ends, although this is not critical to the operation of the system.

While in some embodiments of the system the power generated by the energy recovery apparatus 20 may be directed to the power grid through suitable connections to power lines or conventional power generation facilities, other embodiments of the system may be configured to permit more localized access to the power that is generated by the recovery apparatus. For example, the energy recovery apparatus 20 may also include a power access apparatus 56 to dispense electrical power generated by the generator 46 of the apparatus 20. In some embodiments, the power access apparatus 56 may be positioned adjacent to the road 2 to provide power to vehicles stopped while traveling along the road.

The power access apparatus 56 may include power storage 58 that is in electrical communication with the generator 46 in order to receive power from the generator, and temporarily store the electrical power received from the generator. The power storage 58 may be any suitable means for storing electrical energy, but most suitably will be a rechargeable electrical storage battery that is able to receive, store, and discharge electrical energy.

To dispense the electrical power at the location proximate to the road, or at other locations, the power access apparatus 56 may further include a power access standard 60 that provides access to power produced by the generator 46, typically through the power storage 58, and the power access standard 60 may be in electrical communication with the power storage. The power access standard 60 may have at least one access port or point to provide access to the electrical power stored in the power storage, and in the illustrative embodiments, three access points are provided on the standard 60 for accessing the available electrical power at different voltage levels. Illustratively, the power access standard 60 may have a first access point 62 providing access to power at a first voltage, a second access point 64 providing access to power at a second voltage, and a third access point 66 providing access to power at a third voltage.

To provide electrical power at different voltages, the power access apparatus 56 may include a power voltage converter 68 that is configured to convert power from the generator to at least two different voltages. The power voltage converter 68 may be in communication with the power storage 58 when provided for drawing stored electrical power form the battery. The power voltage converter 68 may output power at various selected and predetermined voltages, such as the first, second and third voltages, although more or less voltage levels may be provided by the converter 68. In some embodiments, the first voltage may be approximately 12 volts to provide power at a voltage that corresponds to that commonly used in vehicle electrical systems. The second voltage may be approximately 120 volts to provide power at a voltage that corresponds to that commonly used in buildings and the appliances used in and about such buildings. The third voltage may be approximately 240 volts to provide power at a voltage that corresponds to that commonly used in commercial facilities utilizing three-phase power.

The power access standard, with the power access points, provides a user of the system, such as a stranded motorist, with means to access power in possibly isolated areas from the energy recovery apparatus for the purpose of recharging an electrical vehicle, jump starting a vehicle with a discharged battery, or even operate an appliance carried in the vehicle (such as the charger for a portable telephone).

A structure 12 such as a vehicle bridge overpass is believed to provide a lower surface 14 that beneficially has a wider (between sides 38 and 39) that creates a tunnel effect that tends to concentrate and focus the air movement occurring proximate to a moving vehicle toward the energy recovery apparatus 20 mounted on the second side of the structure 12. In this sense, the wider the bridge structure in the direction parallel to the movement of vehicles in traffic on the road surface, the greater the effect on the rotating assembly of the rotating apparatus. Moreover, even the natural air movement of wind, if moving in a direction that is relatively perpendicular to the central axis, may cause the rotating assembly to turn and operate the generator to generate electrical power.

With respect to the above description then, it is to be realized that the optimum dimensional relationships for the parts of the disclosed embodiments and implementations, to include variations in size, materials, shape, form, function and manner of operation, assembly and use, are deemed readily apparent and obvious to one skilled in the art in light of the foregoing disclosure, and all equivalent relationships to those illustrated in the drawings and described in the specification are intended to be encompassed by the present disclosure.

Therefore, the foregoing is considered as illustrative only of the principles of the disclosure. Further, since numerous modifications and changes will readily occur to those skilled in the art, it is not desired to limit the disclosed subject matter to the exact construction and operation shown and described, and accordingly, all suitable modifications and equivalents may be resorted to that fall within the scope of the claims.

We claim:

1. An energy recovery apparatus for mounting on a structure to recover energy from air movement caused by vehicles passing under the structure, the energy recovery apparatus comprising:
    a support assembly for mounting on the structure;
    a rotating assembly rotatably mounted on the support assembly, the rotating assembly including a rotating frame and a plurality of blades mounted on the frame such that the blades are free to be rotated by air movement caused by vehicle movement adjacent to the structure when the apparatus is mounted on the structure; and
    a generator operatively connected to the rotating assembly to be driven by rotation of the rotating assembly, the generator generating electrical power when rotated by connection to the rotating assembly;
    wherein the support assembly is configured so that, when the support assembly is mounted on the structure, the rotating assembly is rotatable about a substantially horizontal axis and the rotating assembly is supported in a position characterized by substantially an entirety of the rotating assembly being located above a plane, the plane including a lowermost surface of the structure and extending substantially parallel to a road surface under the structure.

2. The apparatus of claim 1 wherein the blades of the rotating assembly are elongated with a longitudinal axis extending along a longest dimension of a said blade, the blades being mounted on the rotating frame such that the longitudinal axis is oriented substantially parallel to an axis about which the rotating assembly rotates, the blades having at least one substantially planar face positioned in a plane radiating outwardly from a center of rotation of the rotating assembly.

3. The apparatus of claim 1 additionally comprising a shield positioned over at least a portion of the rotating assembly.

4. The apparatus of claim 3 wherein at least a portion of the shield has an arcuate shape extending about the rotating assembly, the support assembly being configured so that, when the support assembly is mounted on the structure, to support the shield in an orientation so that the arcuate shape is curved about a substantially horizontal axis.

5. The apparatus of claim 1 wherein the support assembly is configured so that, when the support assembly is mounted on the structure, the rotating assembly is supported to one side of the structure at a height that is substantially the same as the structure.

6. The apparatus of claim 1 additionally comprising a speed reducer operatively connected between the rotating assembly and the generator to reduce a speed of rotation transferred from the rotating assembly to the generator by the rotating assembly.

7. The apparatus of claim 1 additionally comprising a power access apparatus to dispense electrical power generated by the generator, the power access apparatus being configured to dispense power from the generator at a location adjacent to the apparatus.

8. The apparatus of claim 7 wherein the power access apparatus includes power storage in electrical communication with the generator to receive power from the generator, the power storage being configured to store electrical power received from the generator.

9. The apparatus of claim 7 wherein the power access apparatus includes a power access standard providing access to power produced by the generator, the power access standard having at least one access point for accessing the electrical power.

10. The apparatus of claim 9 wherein the power access standard has a first access point proving access to power at a first voltage and a second access point proving access to power at a second voltage.

11. The apparatus of claim 1 wherein the power access apparatus is configured to provide power at at least two different voltage levels.

12. The apparatus of claim 1 wherein each blade of the plurality of blades has a width, and wherein the support assembly is configured so that, when the support assembly is mounted on the structure, a fractional portion of the width of a lowermost blade extends above the plane and a fractional portion of the width of a lowermost blade extends below the plane.

13. A system for generating electrical energy from vehicle movement on a road, the system comprising:
    a structure spanning at least one traffic lane of a road having a road surface, the structure spaced above the road surface a sufficient distance to permit a vehicle to pass between the structure and the road surface as the vehicle travels along the road;
    an energy recovery apparatus mounted on the structure to recover energy from air movement caused by vehicles passing under the structure on the road, the energy recovery apparatus comprising:

a support assembly mounted on the structure;

a rotating assembly rotatably mounted on the support assembly, the rotating assembly including a rotating frame and a plurality of blades mounted on the frame such that the blades are free to be rotated by air movement caused by vehicle movement adjacent to the structure; and a generator operatively connected to the rotating assembly to be driven by rotation of the rotating assembly, the generator generating electrical power when rotated by connection to the rotating assembly;

wherein the support assembly supports the rotating assembly in a position characterized by substantially an entirety of the rotating assembly being located above a plane, the plane including a lowermost surface of the structure and extending substantially parallel to the road surface under the structure.

14. The system of claim 13 wherein at least a portion of a lower most one of the plurality of blades of the rotating assembly extends to a vertical level lower than the plane, and at least a portion of the lower most blade extends above the plane.

15. The system of claim 13 wherein the blades of the rotating assembly are elongated with a longitudinal axis extending along a longest dimension of a said blade, the blades being mounted on the rotating frame such that the longitudinal axis is oriented substantially parallel to a substantially horizontal axis about which the rotating assembly rotates.

16. The system of claim 13 additionally comprising a shield mounted on the structure and positioned over at least a portion of the rotating assembly.

17. The system of claim 13 additionally comprising a power access apparatus to dispense electrical power generated by the generator, the power access apparatus being positioned at a location adjacent to the apparatus to dispense power from the generator.

18. The system of claim 17 wherein the power access apparatus is configured to provide power at at least two different voltage levels.

19. The system of claim 17 wherein the power access apparatus includes power storage in electrical communication with the generator to receive power from the generator, the power storage being configured to store electrical power received from the generator.

20. The system of claim 13 wherein the structure has a first side oriented toward traffic vehicles approaching the structure on the road surface and a second side oriented toward traffic vehicles moving away from the structure on the road surface; and wherein the support assembly supports the rotating assembly adjacent to the second side of the structure.

21. The system of claim 20 wherein the support assembly supports the rotating assembly at a height that is substantially the same as the structure.

\* \* \* \* \*